(12) United States Patent
Gerlich

(10) Patent No.: US 10,449,623 B2
(45) Date of Patent: Oct. 22, 2019

(54) FASTENING METHOD FOR A BUSHING

(71) Applicant: Eberspächer Exhaust Technology GmbH & Co. KG, Neunkirchen (DE)

(72) Inventor: Harald Gerlich, Schiffweiler (DE)

(73) Assignee: Eberspächer Exhaust Technology GmbH & Co. KG, Neukirchen (DE)

( * ) Notice: Subject to any disclaimer, the term of this patent is extended or adjusted under 35 U.S.C. 154(b) by 662 days.

(21) Appl. No.: 15/241,616

(22) Filed: Aug. 19, 2016

(65) Prior Publication Data

US 2017/0050260 A1 Feb. 23, 2017

(30) Foreign Application Priority Data

Aug. 21, 2015 (DE) .................. 10 2015 216 013

(51) Int. Cl.
| | |
|---|---|
| *B23K 11/34* | (2006.01) |
| *F01N 13/00* | (2010.01) |
| *F16B 37/06* | (2006.01) |
| *F01N 13/18* | (2010.01) |
| *B23K 11/093* | (2006.01) |

(Continued)

(52) U.S. Cl.
CPC .............. *B23K 11/34* (2013.01); *B23K 11/02* (2013.01); *B23K 11/093* (2013.01); *F01N 13/008* (2013.01); *F01N 13/1844* (2013.01); *F16B 37/061* (2013.01); *B23K 2101/006* (2018.08); *F01N 2450/22* (2013.01)

(58) Field of Classification Search
CPC .............. F01N 13/008; F01N 13/1844; F01N 13/1838; F01N 2450/22; B23K 11/02; B23K 11/34; B23K 11/093; B23K 11/0935; F16B 37/061; Y10T 403/477

See application file for complete search history.

(56) References Cited

U.S. PATENT DOCUMENTS 4,240,890 A * 12/1980 Watanabe ............ G01N 27/407
204/410
5,832,723 A * 11/1998 Iwata .................... F01N 13/008
60/276

(Continued)

FOREIGN PATENT DOCUMENTS

| CN | 1033335 A | 6/1989 |
|---|---|---|
| DE | 2434482 A1 | 2/1976 |

(Continued)

*Primary Examiner* — Jonathan P Masinick
(74) *Attorney, Agent, or Firm* — McGlew and Tuttle, P.C.

(57) ABSTRACT

A method for fastening a metallic bushing (3) to a metallic component (2) includes forming a ring-shaped contact surface (5) on the bushing, forming an opening (6) in the component and providing a collar (7) extending circumferentially along the opening in the component and projecting on a mounting side (8) of the component. The mounting side is brought into contact and pressed in the area of the opening in the component such that the contact surface touches the collar. The bushing (3) is pressed on the mounting side (8) of the component in the area of the opening (6), so that the contact surface is in contact with the collar under prestress. With the contact surface (5) in contact with the collar under prestress, the bushing (3) and the component (2) are resistance welded together in the area of the contact between the contact surface (5) and the collar (7).

20 Claims, 3 Drawing Sheets

(51) Int. Cl.
*B23K 11/02* (2006.01)
*B23K 101/00* (2006.01)

(56) References Cited

U.S. PATENT DOCUMENTS

| | | | | |
|---|---|---|---|---|
| 5,867,985 A * | 2/1999 | Furuhashi | ............. | F01N 13/008 60/323 |
| 7,765,801 B2 * | 8/2010 | Hill, Jr. | ................. | F01N 3/2853 60/276 |
| 7,931,120 B2 * | 4/2011 | Nishimura | .............. | F01N 1/085 181/258 |
| 8,087,230 B2 * | 1/2012 | Kikuchi | .................... | F01N 3/10 60/276 |
| 8,459,004 B2 * | 6/2013 | Chang | .................. | F01N 11/007 204/431 |
| 8,893,471 B2 * | 11/2014 | Takagi | .................... | F01N 11/00 60/276 |
| 2005/0022382 A1 | 2/2005 | Brueck et al. | | |
| 2006/0059683 A1 | 3/2006 | Catalogna et al. | | |
| 2016/0237874 A1 * | 8/2016 | Lavalle | ................... | F01N 3/101 |

FOREIGN PATENT DOCUMENTS

| | | |
|---|---|---|
| DE | 10126069 A1 | 5/2002 |
| EP | 0352862 A2 | 1/1990 |
| FR | 2229010 A1 | 12/1974 |
| JP | S60-137580 A | 7/1985 |

\* cited by examiner

FASTENING METHOD FOR A BUSHING

CROSS REFERENCE TO RELATED APPLICATIONS

This application claims the benefit of priority under 35 U.S.C. § 119 of German Patent Application 10 2015 216 013.0 filed Aug. 21, 2015, the entire contents of which are incorporated herein by reference.

FIELD OF THE INVENTION

The present invention pertains to a method for fastening a metallic bushing to a metallic component, preferably in an exhaust system component. The present invention pertains, furthermore, to an exhaust system component, in which at least one bushing is fastened to a component of the exhaust system component according to this method.

BACKGROUND OF THE INVENTION

Bushings made of metal must be fastened in many applications to basically any other component made of metal, for example, in order to make it possible to subsequently mount another add-on piece, which itself can be fastened directly to the component with very great difficulty at best if at all, to said component by means of the bushing. In general, an attachment site can be provided by means of such a bushing for an add-on piece, which is not suitable for direct fastening. This applies especially to mass production. For example, an attached electric part, for example, a sensor, cannot be welded directly to the component. Another, suitable fastening method, for example, a screw connection, may be used for the add-on piece in conjunction with such a bushing. The bushing may therefore advantageously have a screw thread, which can be used to attach the particular add-on piece.

Resistance welding methods are increasingly used to fasten such a metallic bushing to a metallic component in mass production; according to these methods, the bushing is brought into contact with the intended weld joint on the component and heating is performed in the contact area by means of an electric current, and this heating leads to the welding of the bushing to the component. Resistance projection welding, which is often also called projection welding for short, has proved to be especially advantageous in this connection. A ring-shaped projection is formed in this case on the bushing, the projection is pressed onto the component, and it melts during the resistance welding and brings about the welding of the bushing and the component. On the one hand, uniform contact between the weld projection and the component is necessary here for a good welding result. On the other hand, the most constant wall thickness of the component is necessary in the area in which the weld projection is contacted. This can be guaranteed, for example, by the weld projection being located in one plane and by the weld joint of the component being designed as flat. However, a uniform wall thickness and/or a flat configuration cannot always be achieved in case of shaped, especially deep-drawn components. Sub-optimal weld joints, which will require refinishing, may correspondingly be obtained in case of the projection welding of bushings with weld projections on shaped components. The weld joint between the bushing and the component must, as a rule, be gas-tight especially in case of an exhaust system component in order to avoid an emission of exhaust gases into the surrounding area. Furthermore, the weld joints are subject to high alternating mechanical and thermal stresses there, so that a non-uniform weld joint along the weld projection has a reduced durability.

SUMMARY OF THE INVENTION

An object of the present invention is to provide an improved embodiment, which is characterized especially by improved quality of the weld joint between the bushing and the component, for a fastening method of the above-described type and for an exhaust system component, in which at least one bushing is fastened to at least one component.

According to the invention, a method for fastening a metallic bushing on a metallic component is provided. The method comprises forming a ring-shaped contact surface on the bushing, forming an opening on the component and forming a collar on the component, which extends circumferentially and projects on a mounting side of the component. The bushing is pressed on the mounting side of the component in the area of the opening such that the contact surface touches the collar. The bushing is next pressed against the component so that the contact surface is in contact with the collar under prestress. The contact surface is then resistance welded, with the contact surface in contact with the collar under prestress, to weld the bushing and the component together in an area of contact between the contact surface and the collar.

According to another aspect of the invention, an exhaust system component is provided comprising a metallic component formed with an opening and a metallic bushing formed with a ring-shaped contact surface on the bushing. The metallic bushing is fastened to the metallic component by forming a collar on the component, which extends circumferentially and projects on a mounting side of the component. The bushing is pressed on the mounting side of the component in the area of the opening such that the contact surface touches the collar. The bushing is then pressed against the component so that the contact surface is in contact with the collar under prestress. The contact surface is resistance welded, with the contact surface in contact with the collar under prestress, to weld the bushing and the component together in an area of contact between the contact surface and the collar.

The present invention is based on the general idea of providing an opening in the component as well as a providing a collar extending around the opening of the component on the component in the area of the weld joint, wherein the collar comes into contact with a circumferential contact surface of the bushing when the bushing is brought into contact. By pressing the bushing against the component, a prestressed contacting of the contact surface can be brought about with the collar, and a resistance welding can then be performed. A weld projection provided on the bushing can be eliminated in this manner, because the function of the weld projection is assumed by the collar provided on the projection. In addition, this collar assumes an additional function. Unlike a bushing-side weld projection, the collar is springy (elastic). As a result, the collar can yield in a springy manner when the bushing is pressed against the component and compensate inequalities in the wall thickness and/or deviations from a plane in the circumferential direction along the collar. A sufficiently homogeneous weld joint can be prepared during the subsequent resistance welding under prestress along the circumference of the collar between the bushing and the component, as a result of which the quality of the weld joint is improved. It was found, in particular, that the amount of refinishing needed is reduced when this method is employed.

Thus, the bushing is pressed on in the method being described here such that the collar yields in a springy manner in order to come into contact with the contact surface in a largely closed form in the circumferential direction. It is clear that a plastic deformation of the collar may, in principle, also be associated with the springy yielding of the collar. However, this is rather small, as a rule, compared to the springy (elastic) deformation. Furthermore, the phrase "largely closed" shall express the fact that the contact between the collar and the contact surface does not necessarily have to take place in a fully closed form in the circumferential direction, but this is preferred. Minor defects, in which there is no contact between the contact surface and the collar, may still also be tolerated, in principle, in the circumferential direction. It is, however, achieved due to the pressing on in conjunction with the springy collar that these defects are markedly smaller, occur in a markedly smaller number and are eliminated altogether in the ideal case.

The bushing is positioned essentially centrally in relation to the opening in the component before the resistance welding in the area of the opening in the component and is pressed on. The phrase "essentially centrally" allows for usual manufacturing tolerances. In particular, the bushing is thus pressed against the component such that a springy deformation of the collar will be associated with it.

This method is suitable, in principle, for any resistance welding. However, a medium-frequency resistance welding is preferably employed. The welding technique is a resistance welding technique that operates with direct current and an inverter unit. The cycle frequencies of a current inverter used here are usually between 1,000 Hz and 4,000 Hz. The method being presented here has proved to be especially advantageous for capacitor discharge welding. A bank of capacitors, which can release a relatively large amount of energy during comparatively short welding pulses and which can be recharged with a comparatively low electric power between consecutive welding pulses, is used here.

The collar is preferably formed by shaping an opening edge, which borders the opening in the component, so that it forms an integral part of the component. The collar is prepared and shaped preferably during the preparation of the opening in the component. A combined punching and shaping operation, which is carried out in a single working step or in at least two working steps, is conceivable.

According to an advantageous embodiment, the contact surface on the bushing is flat. The contact surface is consequently located in a contact plane. As a result, comparatively broad tolerances can be obtained when centering the bushing relative to the opening in the component.

As an alternative, the contact surface on the bushing may also have a conical shape, so that the contact surface quasi forms the envelope of a cone or a cone. This design leads to self-centering of the bushing relative to the opening in the component when the bushing is brought into contact with the collar via this conical contact surface.

In another embodiment, the bushing may have a through hole, which adjoins the opening in the component in the welded-on state and which defines a central longitudinal axis of the bushing. The central longitudinal axis of the bushing now corresponds to the central longitudinal axis of the straight and advantageously cylindrical, preferably regular cylindrical through hole. The bushing may have, in addition, a coupling area, which adjoins the contact surface on a side facing away from the component and is used for attaching an add-on piece. Typical add-on pieces may be, as was mentioned, electric components, for example, sensors and the like. Such an add-on piece may preferably be a sensor, for example, for detecting temperature, pressure, oxygen, sulfur and/or nitrogen oxides. In the coupling area, the bushing may have, in particular, a screw thread, preferably an internal tread, which is formed in a wall enclosing the through hole.

The contact surface extends in a ring-shaped circular path in a circumferential plane. According to an advantageous embodiment, the central longitudinal axis of the bushing may extend at right angles to the circumferential plane. This leads to a configuration that makes it possible to connect the respective add-on piece along a straight line in the area of the opening in the component, so that this configuration may also be called a straight bushing. As an alternative hereto, the central longitudinal axis of the bushing may be closed in an angle range of 15° to 75°, preferably 30° to 60°, and especially 40° to 50° in relation to the circumferential plane. This leads to an oblique structure, which makes it possible to connect the respective add-on piece to the component obliquely. This oblique configuration may also be called an oblique bushing.

According to another embodiment, a self-supporting edge of the collar may be rounded off before bringing the bushing into contact. The rounding of the self-supporting edge of the collar is preferably performed during the manufacture of the collar. The self-supporting edge is an end facing the bushing during the bringing into contact of the bushing. The rounded self-supporting edge of the collar leads to a linear contact with the contact surface, which improves the welding result.

In an alternative embodiment, the self-supporting edge may have a circumferential collar surface, which is defined by a circumferential outer edge, on the one hand, and by a circumferential inner edge, on the other hand. The outer edge has a greater distance from the opening in the component than does the inner edge, so that the outer edge is arranged distally in relation to the opening in the component, while the inner edge is arranged proximally in relation to the opening ion the component. Such a configuration can be embodied in an especially simple manner by a punching operation during the preparation of the opening in the component.

According to a variant, the collar surface may be flat, so that it is located in a collar plane. A combination with the embodiment described above, in which the contact surface is flat, is especially advantageous in this connection. The contact surface and the collar surface come flatly into contact with one another in this case, which makes it possible to prepare an especially intimate weld joint.

As an alternative to this, the contact surface may also have a conical shape, so that it forms a cone or the envelope of a cone. This configuration can be manufactured more easily and facilitates the springy characteristic of the collar.

Provisions may be made in another advantageous embodiment for the collar to have a cylindrical, especially regular cylindrical shape. The collar forms a cylinder jacket in this case. As a result, a cross section of the opening in the component can be prepared with comparatively narrow tolerances. Furthermore, this embodiment is favorable for the flat design of the collar surface.

As an alternative to this, the collar may have a conical shape, so that the envelope of a cone or a cone is formed. This embodiment leads to improved elasticity of the collar in the direction in which the bushing is pressed on.

In another embodiment, the bushing may have a ring-shaped projection, which is bordered by the contact surface and which enters into the opening in the component when the bushing is pressed on. A positive-locking positioning is achieved hereby during assembly between the bushing and the component in the area of the opening in the component, which increases the reliability of the production. If the through hole is provided, this also passes centrally through the projection.

According to an advantageous variant, the projection may have a circular, ring-shaped circumferential surface facing the contact surface. This circumferential surface may preferably have a cylindrical, especially regular cylindrical shape. Consequently, the circumferential surface forms a cylinder jacket. Such a cylindrical circumferential surface can be prepared in an especially simple manner at the projection of the bushing. Furthermore, with the aforementioned cylindrical design of the collar, it can form a plug-type connection between the bushing and the component, in which the projection can be plugged into the collar. This also simplifies a functionally reliable assembly.

As an alternative to this, the circumferential surface may have a conical shape, so that it forms the jacket of a cone or a cone. In this case, the conical circumferential surface leads to centering of the bushing relative to the opening in the component when the bushing is brought into contact.

The aforementioned projection is preferably formed in this case on the bushing if the contact surface is flat.

According to another advantageous embodiment, which combines a number of the aforementioned embodiments with one another in a specific manner, the collar may be conical, a self-supporting edge of the collar may have an outer edge, which is a distal edge in relation to the opening in the component and an inner edge, which is a proximal edge in relation to the opening in the component; the bushing may have a ring-shaped projection, which is bordered by the contact surface and which enters into the opening in the component when the bushing is brought into contact; the projection may have a peripheral, ring-shaped, circumferential surface facing the contact surface; the circumferential surface may be cylindrical and the contact surface may be flat. The bushing can be pressed onto the component in this constellation according to a preferred embodiment such that the outer edge comes into contact with the contact surface and the inner edge with the circumferential surface. An especially high-quality weld joint can be prepared hereby during the subsequent resistance welding, because the collar melts at the linear contact of the outer edge with the contact surface, on the one hand, and at the linear contact of the inner edge at the circumferential surface, on the other hand, and the bushing is integrated hereby in the weld joint via both the contact surface and the circumferential surface.

An exhaust system component according to the present invention has at least one component, for example, a housing, to which at least one bushing is fastened according to the above-described method. The bushing is used, for example, to attach a sensor. The exhaust system component may be an exhaust muffler, a catalytic converter, a particle filter or any combination thereof.

It is apparent that the above-described features, which will also be explained below, can be used not only in the particular combination described, but also in other combinations or alone, without going beyond the scope of the present invention.

Preferred exemplary embodiments of the present invention are shown in the drawings and will be explained in more detail in the following description, where identical reference numbers designate identical or similar or functionally identical components.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
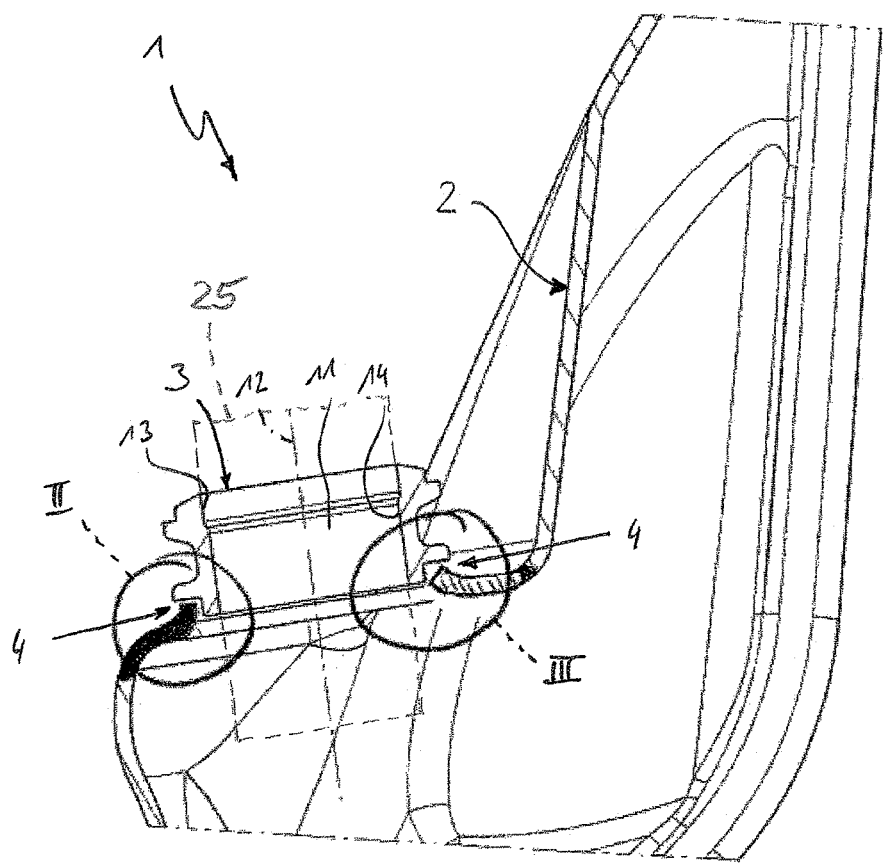
FIG. 1 is a sectional view of an exhaust system component in the area of a bushing, showing two different embodiments before being welded onto a component of the exhaust system component.

Referring to the drawings, corresponding to FIG. 1, an exhaust system component 1, which may be, for example, a catalytic converter, has at least one component 2, for example, a housing, on which at least one bushing 3 is fastened. The bushing 3 is fastened to the component 2 in this case by means of a welding method, which will be described in more detail below. However, the welding process is not yet completed in the views shown in FIGS. 1 through 7, so that, in particular, no weld joint or weld seam can be seen in FIGS. 1 through 7. A position, in which a weld joint or joint will be located after completion of the welding process, is designated by 4 in FIG. 1.

To carry out the welding method, the component 2 and the bushing 3 are manufactured from a metal. The metal may be, in principle, any of the different metals insofar as these metals can be welded with one another. According to FIGS. 2 through 7, a ring-shaped contact surface 5 is formed on the bushing 3. An opening 6 is formed on the component 2. In addition, a collar 7 extending circumferentially along the opening 6 in the component is formed on the component 2. The collar 7 projects or juts off on a mounting side 8 of the component 2, which side is intended for bringing the bushing 3 into contact in a contacting direction 9 indicated by an arrow.

Figure 2:
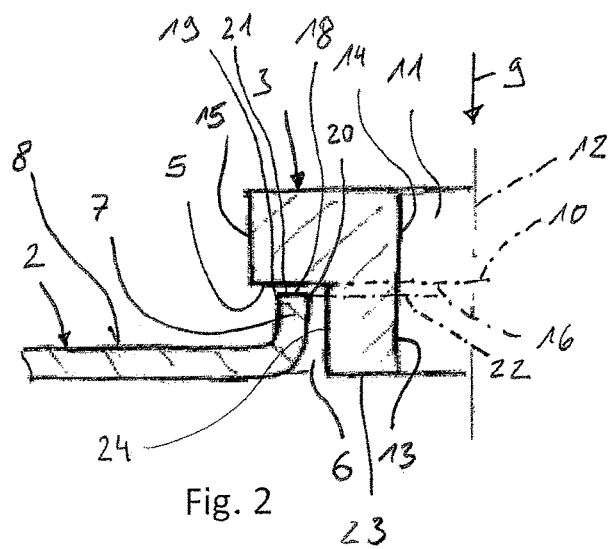
FIG. 2 is a simplified sectional view of a detail II from FIG. 1.
Figure 3:
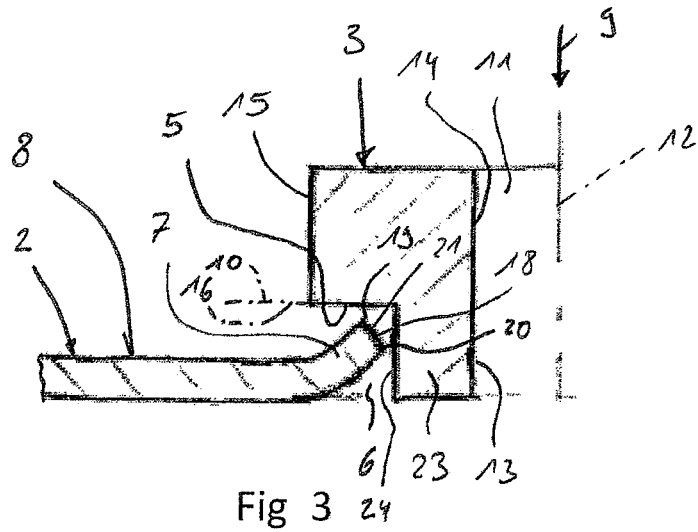
FIG. 3 is a simplified sectional view of a detail III from FIG. 1.
Figure 4:
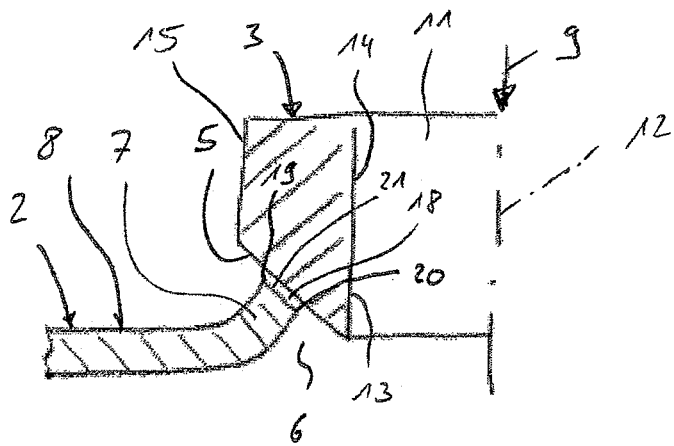
FIG. 4 is a further view similar to those in FIGS. 2 and 3 but showing a further embodiment.

The bushing 3 is brought into contact on the mounting side 8 essentially centrally with the opening 6 in the component, such that the contact surface 5 touches the collar 7. It is noteworthy in FIG. 1 that two different embodiments, which are shown in an enlarged form in FIGS. 2 and 3, are shown in the details II and III. It is clear that preferably only a single embodiment is embodied within one weld joint 4.

The bushing 3 is subsequently pressed against the component 2 in the contacting direction 9, such that the contact surface 5 is in contact with the collar 7 under prestress. While the contact surface 5 is in contact with the collar 7 under prestress, resistance welding is performed, such that the bushing 3 and the component 2 are welded together in the area of the contact between the contact surface 5 and the collar 7. The ring-shaped circumferential weld joint 4 indicated in FIG. 1 is thus ultimately formed.

A capacitor discharge welding, which is characterized by especially short welding pulses, is preferably used for the resistance welding.

The contact surface 5 is flat in the embodiments shown in FIGS. 2, 3 and 5-7, so that it is located in a contact plane 10. The contact surface 5 is, by contrast, conical in the embodiment shown in FIG. 4.

In all embodiments shown, the bushing 3 has a through hole 11. This adjoins the opening 6 in the component in the mounted state, i.e., with the bushing 3 welded on. The through hole 11 is straight, so that it defines the central longitudinal axis 12 of the bushing 3. The through hole 11 is bordered by a cylindrical wall 13, which advantageously has an internal thread 14. Furthermore, the bushing 3 has a coupling area 15, which adjoins the contact surface 5 on the side facing away from the component 2 and which is used to attach an add-on piece 25, which is indicated with broken line in FIG. 1 only, for example, a sensor. This coupling area 15 is formed, in particular, by a body of the bushing 3, on which the contact surface 5 is formed.

Figure 6:
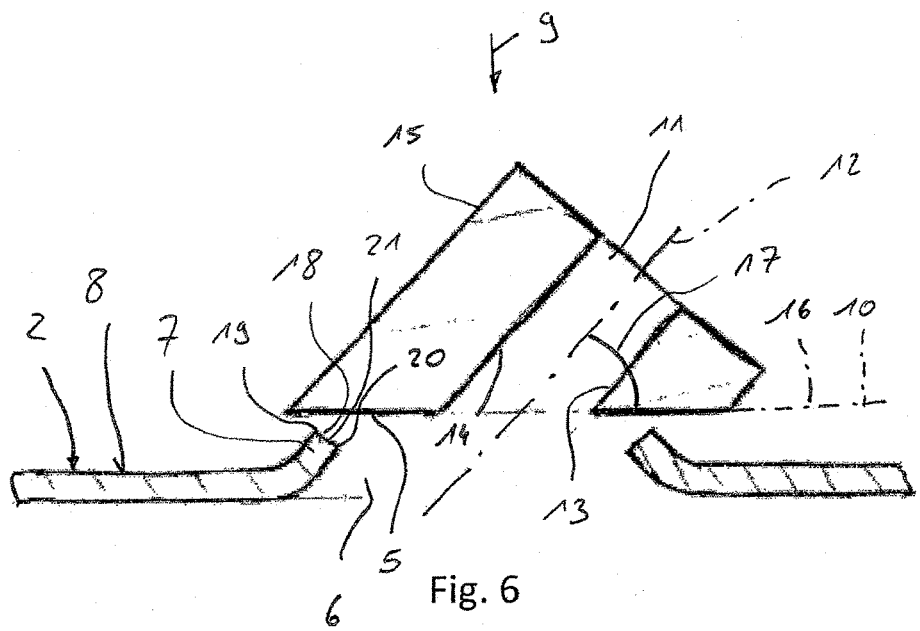
FIG. 6 is a simplified sectional view in the area of the bushing before welding, but for another embodiment.
Figure 7:
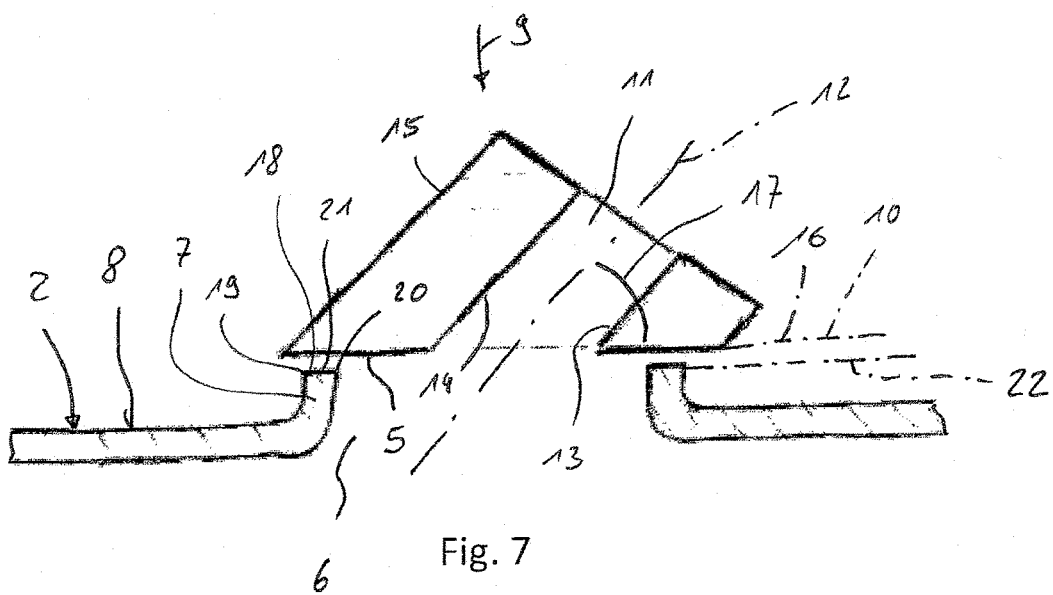
FIG. 7 is a simplified sectional view in the area of the bushing before welding, but for still another embodiment.

The contact surface 5 extends in a ring-shaped pattern along a circular path. This circular path is located in a circumferential plane 16 in case of a flat contact surface 5. The central longitudinal axis 12 extends at right angles to the circumferential plane 16 in the embodiments according to FIGS. 2, 3 and 5. Contrary to this, FIGS. 6 and 7 show exemplary embodiments in which the central longitudinal axis 12 is sloped in relation to this circumferential plane 16 and thus forms a slope angle 17, which equals, purely as an example, about 45° in the examples shown in FIGS. 6 and 7. An angle range of 15° to 75° is advantageous for this angle range 17. An angle range of 30° to 60° is preferred. Especially preferred is an angle range of 40° to 50°.

According to FIGS. 2 through 7, the collar 7 has a self-supporting edge 18, which is located at an end of the collar 7, which end faces the bushing 3, when the bushing 3 is brought into contact. According to the embodiment indicated as an example in FIG. 5, this self-supporting edge 18 may, in principle, be rounded. However, the embodiment shown in FIGS. 2 through 4, 6 and 7, in which the self-supporting edge 18 has an outer edge 19, which is a distal edge in relation to the opening 6 in the component, and an inner edge 20, which is a proximal inner edge in relation to the opening 6 in the component, is preferred. Further, the self-supporting edge 18 has a collar surface 21, which is defined by the outer edge 19 radially on the outside and by the inner edge 20 radially on the inside. Such a constellation can be manufactured in an especially simple manner if the opening 6 in the component is formed in the component 2 by a punching operation.

The component 2 is preferably manufactured by a shaping operation, for example, by deep drawing. The opening 6 in question in the component can subsequently be formed, for example, by a punching operation. The collar 7 may likewise be formed by a shaping operation integrally on the component 2. The collar 7 may have a wall thickness varying along its circumferential direction due to the deep-drawing of the component 2 and to the collar 7 being prepared by a shaping operation. Further, due to the tolerances, the self-supporting edge 18 may have varying distances in the circumferential direction in relation to a reference plane extending at right angles to the axial direction of the opening 6 in the component. These manufacturing-related variations can be compensated by the fastening method being described here especially by the collar 7 being springy (elastically deformable) in the contacting direction 9, so that when the bushing 3 is pressed onto the component 2, an optimal contact can be achieved between the contact surface 5 and the collar 7, which contact makes it possible to obtain a weld joint 4 of a sufficiently high quality during the resistance welding.

The aforementioned collar surface 21 is flat in the embodiments according to FIGS. 2 and 7, so that the collar surface 21 is located in a collar plane 22. The contact surface 21 is, by contrast, of a conical shape in the embodiments according to FIGS. 3, 4 and 6, so that it forms a cone or the envelope of a cone.

Figure 5:
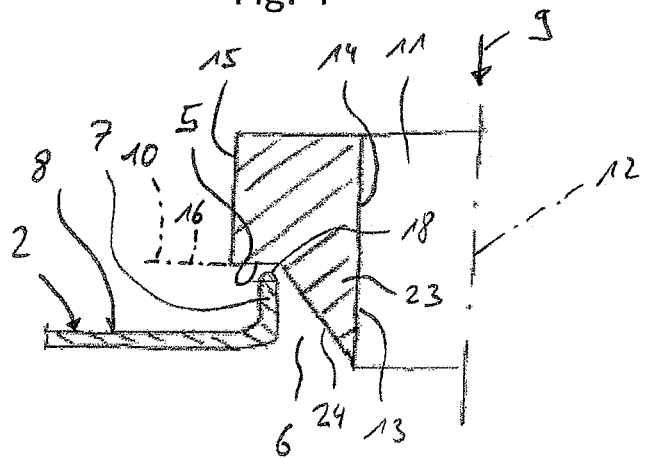
FIG. 5 is a further view similar to those in FIGS. 2 and 3 but showing a further embodiment.

The collar 7 is cylindrical in the embodiments according to FIGS. 2, 5 and 7, so that it forms a cylinder jacket. Contrary to this, the collar 7 is conical in the preferred exemplary embodiments shown in FIGS. 3, 4 and 6, so that it forms the envelope of a cone or a cone. The conical shape of the collar 7 increases the springiness of the collar 7 in the contacting direction 9.

In the exemplary embodiments according to FIGS. 2, 3 and 5, the bushing 3 is provided with a ring-shaped projection 23, which is bordered by or is arranged concentrically in the contact surface 5. The projection 23 leads when bringing the bushing 3 into contact and is coordinated with the opening 6 in the component such that it enters the opening 6 in the component. The projection 23 is an integral component of the bushing body, which is formed especially by the coupling area 15. In particular, the aforementioned internal thread 14 can thus extend up into the projection 23. Unlike in FIGS. 2, 3 and 5, no such projection 23 is provided in the embodiments according to FIGS. 4, 6 and 7. The contact surface 5 forms the leading end or the end of the bushing 3 facing the component 2 in these embodiments.

According to FIGS. 2, 3 and 5, said projection 23 has a circumferential surface 24, which faces the contact surface 5 and extends circumferentially in a ring-shaped pattern. The circumferential surface 24 is thus located on the outer side of the projection 23 facing away from the through hole 11. This circumferential surface 24 is cylindrical in the embodiments according to FIGS. 2 and 3, so that it forms a cylinder jacket. Contrary to this, FIG. 5 shows an embodiment in which the circumferential surface 24 is of a conical shape, so that it forms the envelope of a cone or a cone.

The different embodiments described in reference to FIGS. 2 through 7 may, in principle, be combined with one another as desired. However, the embodiment shown in FIG. 3 has proved to be especially advantageous. The collar 7 is conical according to the embodiment of FIG. 3. The self-supporting edge 18 has the outer edge 19 and the inner edge 20. The bushing 3 has a projection 23 with a circumferential surface 24. The circumferential surface 24 is cylindrical. The contact surface 5 is flat. When the bushing 3 is pressed on, an axial contact will first become established due to this configuration between the outer edge 19 and the contact surface 5. In addition, a radial contact will become established due to the springy yielding of the collar 7 between the inner edge 20 and the circumferential surface 24. A weld joint 4 of an especially high quality can be obtained as a result during the subsequent welding process.

Even though a bushing 3, which does not have a weld projection, is used in the embodiments preferred here, the method being described here may be embodied with a conventional bushing 3, which has a ring-shaped weld projection, which will then have the contact surface 5 and which will come into contact with the collar 7. Depending on the configuration, the contact of the self-supporting end 18 of the collar 7 may be located at an outer flank of the weld projection, e.g., over the inner edge 20, or at an inner flank of the weld projection, e.g., over the outer edge 19, or on an end face of the weld projection, e.g., over the front-side collar surface 21.

While specific embodiments of the invention have been shown and described in detail to illustrate the application of the principles of the invention, it will be understood that the invention may be embodied otherwise without departing from such principles.

What is claimed is:

1. A method for fastening a metallic bushing on a metallic component, the method comprising the steps of:
    forming a ring-shaped contact surface on the bushing;
    forming an opening on the component;
    forming a collar on the component, which extends circumferentially and projects on a mounting side of the component;
    pressing the bushing on the mounting side of the component in the area of the opening such that the contact surface touches the collar;
    pressing the bushing against the component so that the contact surface is in contact with the collar under prestress; and
    resistance welding the contact surface, with the contact surface in contact with the collar under prestress, to weld the bushing and the component together in an area of contact between the contact surface and the collar.

2. A method in accordance with claim 1, wherein the contact surface is flat.

3. A method in accordance with claim 1, wherein the contact surface is conical.

4. A method in accordance with claim 1, wherein:
    the bushing has a through hole which adjoins the opening in the component in the welded-on state and defines a central longitudinal axis of the bushing; and
    the bushing has a coupling area which adjoins the contact surface on a side facing away from the component and is used to attach an add-on piece.

5. A method in accordance with claim 4, wherein:
    a circular path, along which the contact surface extends in a ring-shaped pattern, is located in a circumferential plane; and
    the central longitudinal axis extends at right angles to the circumferential plane.

6. A method in accordance with claim 4, wherein:
    a circular path, along which the contact surface extends in a ring-shaped pattern, is located in a circumferential plane; and
    the central longitudinal axis is sloped in relation to the circumferential plane in an angle range of 15° to 75°.

7. A method in accordance with claim 1, wherein a self-supporting edge of the collar is rounded before bringing the bushing into contact.

8. A method in accordance with claim 1, wherein before bringing the bushing into contact such that the contact surface touches the collar, a self-supporting edge of the collar is formed with a circumferential collar surface, which is defined by an outer edge, which is a distal edge in relation to the opening in the component, and by an inner edge, which is a proximal edge in relation to the opening in the component.

9. A method in accordance with claim 8, wherein the collar surface is flat.

10. A method in accordance with claim 8, wherein the collar surface is conical.

11. A method in accordance with claim 1, wherein the collar is cylindrical.

12. A method in accordance with claim 1, wherein the collar is conical.

13. A method in accordance with claim 1, wherein the bushing has a ring-shaped projection, which is bordered by the contact surface and enters the opening in the component when the bushing is being brought into contact such that the contact surface touches the collar.

14. A method in accordance with claim 13, wherein the projection has a peripheral, ring-shaped circumferential surface, which faces the contact surface and is cylindrical.

15. A method in accordance with claim 13, wherein the projection has a peripheral circumferential surface, which faces the contact surface and is conical.

16. A method in accordance with claim 1, wherein:
    the collar is conical;
    a self-supporting edge of the collar has an outer edge, which is a distal edge in relation to the opening in the component, and an inner edge, which is a proximal edge in relation to the opening in the component;
    the bushing has a ring-shaped projection, which is bordered by the contact surface and which enters the opening in the component when the bushing is being brought into contact;
    the projection has a peripheral circumferential surface, which faces the contact surface;
    the circumferential surface is cylindrical;
    the contact surface is flat; and
    the bushing is pressed on such that the outer edge is in contact with the contact surface and the inner edge is in contact with the circumferential surface.

17. A method for fastening a metallic bushing on a metallic component, the method comprising the steps of:
    forming a ring-shaped contact surface on the bushing;
    forming an opening on the component;
    forming a collar on the component, which extends circumferentially and projects on a mounting side of the component;
    pressing the bushing on the mounting side of the component in the area of the opening such that the contact surface touches the collar;
    pressing the bushing against the component such that the collar yields by elastically deforming or elastically and plastically deforming at least in some locations along the collar so that the contact surface is in contact with the collar under prestress with the contact surface; and
    resistance welding the contact surface, with the contact surface in contact with the collar under prestress, to weld the bushing and the component together in an area of contact between the contact surface and the collar.

18. An exhaust system component comprising:
    a metallic component formed with an opening; and
    a metallic bushing formed with a ring-shaped contact surface on the bushing, the metallic bushing being fastened to the metallic component by the steps of:
    forming a collar on the component, which extends circumferentially and projects on a mounting side of the component;
    pressing the bushing on the mounting side of the component in the area of the opening such that the contact surface touches the collar;

pressing the bushing against the component so that the contact surface is in contact with the collar under prestress; and resistance welding the contact surface, with the contact surface in contact with the collar under prestress, to weld the bushing and the component together in an area of contact between the contact surface and the collar.

19. An exhaust system component in accordance with claim 18, wherein:

the bushing has a through hole which adjoins the opening in the component in the welded-on state and defines a central longitudinal axis of the bushing;

the bushing has a coupling area which adjoins the contact surface on a side facing away from the component and is used to attach an add-on piece; and the contact surface is flat.

20. An exhaust system component in accordance with claim 18, the bushing has a through hole which adjoins the opening in the component in the welded-on state and defines a central longitudinal axis of the bushing;

the bushing has a coupling area which adjoins the contact surface on a side facing away from the component and is used to attach an add-on piece; and the contact surface is conical.

* * * * *